UNITED STATES PATENT OFFICE.

ALEXANDER BESAW, OF WEST DEPERE, WISCONSIN.

COMPOUND FOR EXTERMINATING WEEDS.

SPECIFICATION forming part of Letters Patent No. 663,071, dated December 4, 1900.

Application filed August 3, 1899. Serial No. 725,989. (No specimens.)

*To all whom it may concern:*

Be it known that I, ALEXANDER BESAW, a citizen of the United States, residing at West Depere, in the county of Brown and State of Wisconsin, have invented a new and useful Compound, of which the following is a specification.

This invention relates to compounds for exterminating weeds, and has for one object to provide an improved composition of matter which is particularly adapted for destroying the roots of the Canada thistle, although equally efficient when applied to any other character of weed.

A further object of my invention is to provide a composition which, while efficient, immediately after application in destroying noxious plants fertilizes the soil, so that the same is rendered capable after the destruction of the weeds of supporting plant life.

The composition consists of, gasolene, one gallon; turpentine, two ounces; benzole, two ounces; aqua-ammonia, two ounces; saltpeter, one ounce. These ingredients are thoroughly mixed into a solution which may be applied by a suitable sprinkler and sprinkled upon the leaves and stalks of the plant. The proportions of the ingredients given are the best known to me, although they may be varied somewhat and still accomplish the purpose of the invention.

While the aqua-ammonia adds to the efficiency of the compound, the same may be dispensed with, and I have in practice completely destroyed Canada thistle, burdocks, and other noxious weeds by the application of the compound in which the aqua-ammonia was omitted.

The saltpeter which forms an ingedient in the compound fertilizes the soil to which the compound is applied, so that immediately after the destruction of the weeds the soil is rendered capable of supporting plant life, and hence is not injured.

Having thus described my invention, I claim—

A compound for exterminating weeds, consisting of benzole, a volatile vehicle, and a fertilizing ingredient, substantially as described.

In testimony that I claim the foregoing as my own I have hereto affixed my signature in the presence of two witnesses.

ALEXANDER BESAW.

Witnesses:
 EFFIE LAUNDRY,
 THEREAIA VAN ECKEWORT.